United States Patent [19]

Fury et al.

[11] Patent Number: 4,988,974

[45] Date of Patent: Jan. 29, 1991

[54] WARNING AND SAFETY SYSTEM INDICATING TRUCK TRAILER TIP-OVER CONDITION

[76] Inventors: Tommy J. Fury, 1613 Colonial Pkwy., Clovis, N. Mex. 88101; Gerald D. Bailey, Rte. 1, Box 191, Farwell, Tex. 79325

[21] Appl. No.: 380,498

[22] Filed: Jul. 17, 1989

[51] Int. Cl.[5] .................... G08B 21/00

[52] U.S. Cl. .................... 340/431; 340/440; 340/689; 340/673; 340/671; 280/432

[58] Field of Search .................... 340/431, 440, 689, 686, 340/665, 666, 671, 672, 673, 674, 685; 280/433, 432

[56] References Cited

U.S. PATENT DOCUMENTS

| | | | |
|---|---|---|---|
| 3,640,578 | 2/1972 | Finney | 298/17 |
| 3,644,755 | 9/1969 | Brown | 298/22 |
| 3,921,128 | 10/1975 | Snead . | |
| 4,216,996 | 8/1980 | Pitts | 298/17 |
| 4,221,530 | 9/1980 | Williams et al. | 414/673 |
| 4,349,809 | 9/1982 | Tomes | 340/440 |
| 4,658,508 | 4/1987 | Oberg | 340/440 |
| 4,682,145 | 7/1987 | Brawner, Jr. | 340/52 |
| 4,737,759 | 4/1988 | Stropkay et al. | 340/440 |

*Primary Examiner*—Donnie L. Crosland

*Attorney, Agent, or Firm*—DeWitt M. Morgan

[57] ABSTRACT

A warning and safety system for tractor-trailer dump trucks to indicate that the raised trailer is in a precarious position and in danger of tipping over, which system measures the pivot angle or the angle of revolution of the front end of the trailer. When the raised trailer is in an unstable position and begins to tip over, the front end of the trailer pivots on the hydraulic telescoping cylinder extending from the fifth wheel of the trailer. Mounted directly onto to hydraulic telescoping cylinder is an instrument sensitive to angular motion, or, alternatively, mounted on the fifth wheel of the tractor is a pivoting canister containing that instrument, from which a cable extends, parallel to the hydraulic telescoping cylinder, to the bottom of the front end of the trailer, where the cable engages with a pulley arrangement securely mounted on the cylinder well of the trailer. When the warning and safety system detects that the tipping angle of the trailer is equal to or greater than predetermined, but adjustable, critical angles, various first stage and second stage alarms are triggered. The first stage alarms may comprise audio and visual alarms, whereas the second stage alarms automatically dump the oil from the hydraulic telescoping cylinder back into the oil reserve tank and immediately lower the trailer. The location of the pivoting canister on the fifth wheel prevents spurious false alarms, as does the time-delayed dampened instrumentation within the canister. Power is supplied automatically to the warning and safety system either by using a pressure-sensitive switch which turns on the system as soon as the trailer is raised a small distance, or by wiring a switch into the gate-release switch.

13 Claims, 4 Drawing Sheets

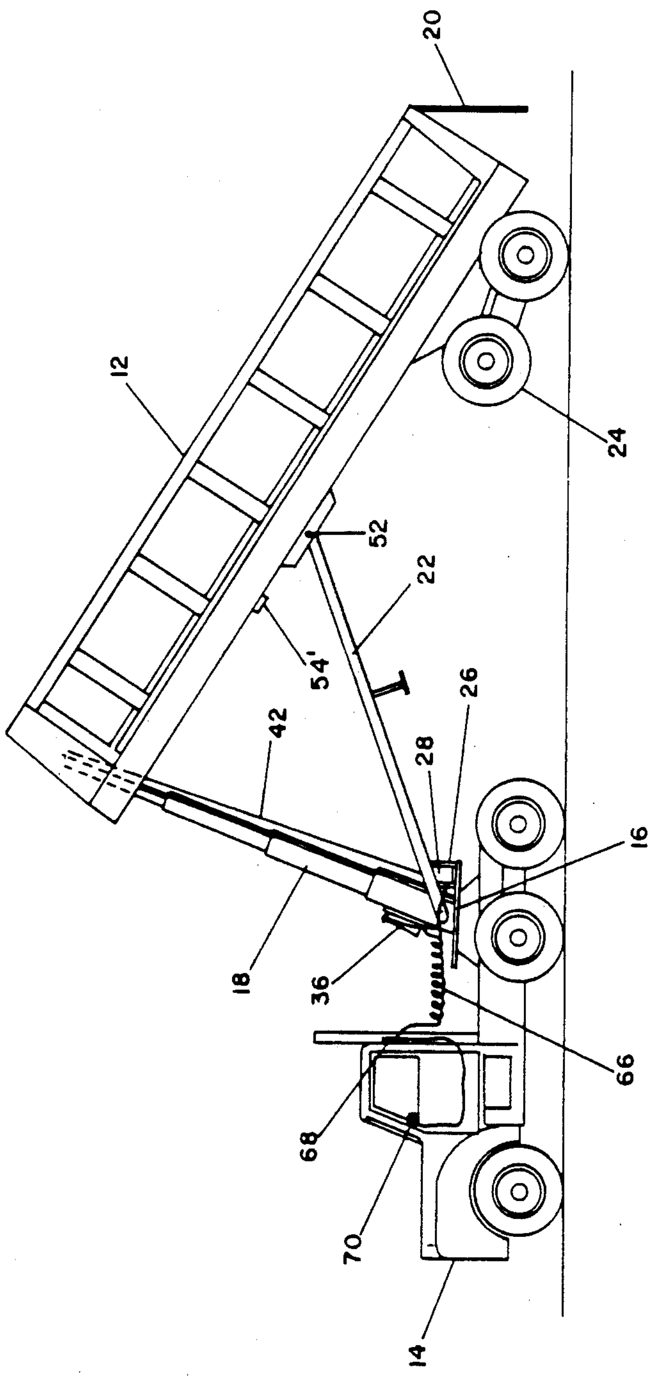
FIG—1

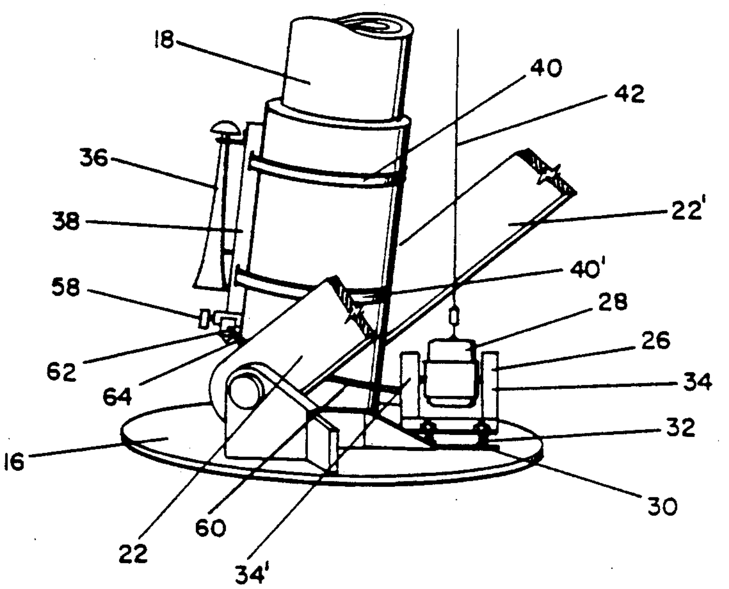
FIG—2
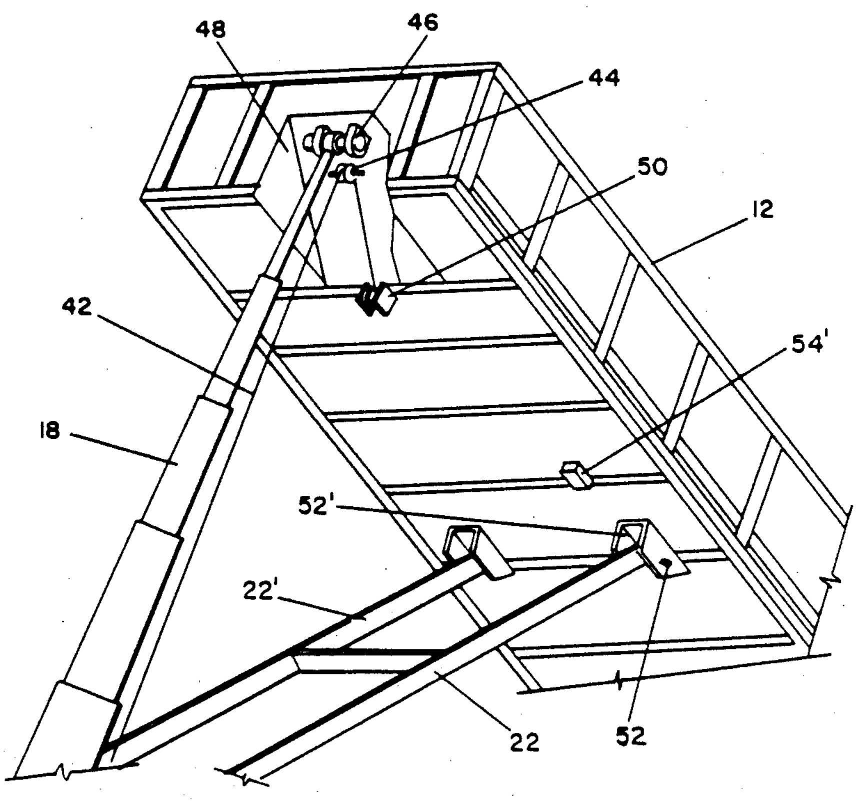
FIG—3

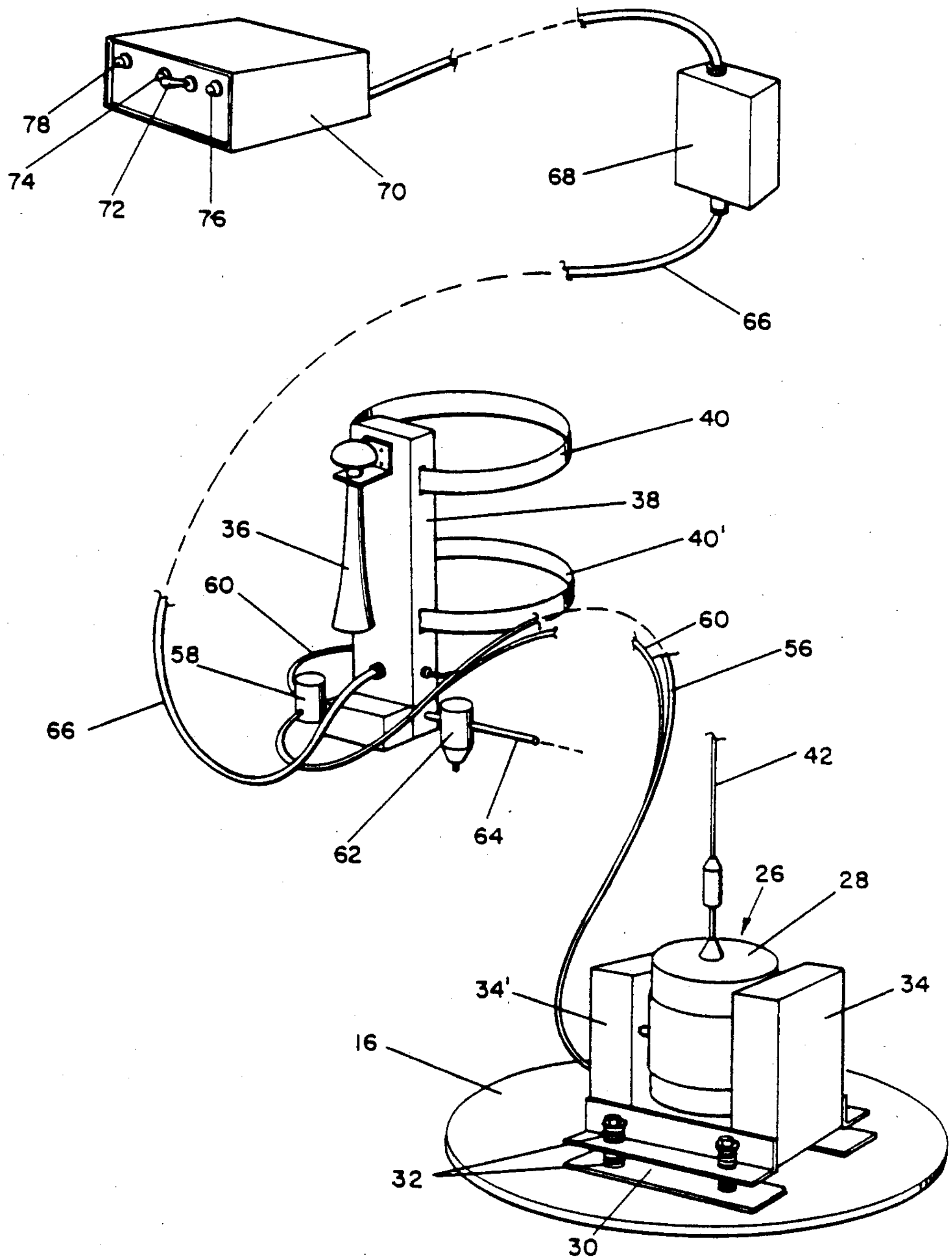
FIG—6

WARNING AND SAFETY SYSTEM INDICATING TRUCK TRAILER TIP-OVER CONDITION

This invention relates to trucks which haul and dump loads in general and, more particularly, to a system that detects when the raised trailer is approaching a critical lateral angle and is thus at risk of tipping on its side.

BACKGROUND OF THE INVENTION

Large dump trucks, usually eighteen-wheelers, having a tractor and a trailer are used to haul and dump large quantities of material, such as dirt, gravel, etc. The rear portion of the trailer nearest the back wheels may or may not be rigidly mounted on a chassis frame. On a frameless truck where the trailer is not rigidly mounted to the wheel chassis, the tandem rear wheels on either side towards the front of the bed are also lifted from the ground when the trailer is raised, so that the points of contact between the trailer and the earth are only on the very rear tandem wheels. When dumping a load, the front end of the trailer nearest the tractor is raised by means of an hydraulic telescoping cylinder, and the dumped material exits the trailer through a hinged tailgate at the rear of the trailer. Because of the nature of the location where these trucks are often used, the ground surface when loading and unloading the dump truck is usually not level; and if the load is dumped on a fresh land fill, the underlying ground may settle rapidly because of the weight of the truck, and/or the load within the trailer may shift. When the truck trailer is raised for dumping the transported material, the center of gravity of the truck trailer is also raised, and if the magnitude of the lateral force vector at the center of gravity exceeds the magnitude of vertical force vector, such as when the truck is on an uneven surface or when the load shifts suddenly, the truck trailer tips over. If the trailer tips, the transported material may be damaged, the truck trailer and tractor may be severely damaged, and worst of all, human life may be harmed or lost.

Truck drivers, truck owners and construction site operators are not unaware of the possibility of a truck trailer tipping over and the resultant loss of time, materials, labor and possible human life. As a result, a number of devices have been disclosed which may level the trailer of the truck, or indicate that an unsafe condition exists when the trailer is unstable, or may even automatically lower the trailer if a hazardous condition exists. Such devices for detecting when a truck trailer is approaching a tip-over condition are generally placed on the underside of the trailer bed or adjacent to the rear wheels, and measure the deviation of the roll angle of the truck bed from the horizontal. Examples of this type of device are given U.S. Pat. No. 4,682,145, entitled "TRUCK LEVEL SENSING AND INDICATING SYSTEM" to Brawner, Jr.; U.S. Pat. No. 4,216,996, entitled "STABILIZER FOR DUMPING VEHICLES" to Pitts; U.S. Pat. No. 3,921,128, entitled "TRUCK ROLL WARNING SYSTEM" to Snead; U.S. Pat. No. 3,640,578, entitled "LEVELLING SYSTEM FOR SEMI END DUMP TRUCKS" to Finney; U.S. Pat. No. 3,464,755, entitled "DUMP TRAILER SAFETY DEVICE" to Brown.

Brawner, Jr. '145 employs a plumb vane mechanism mounted on the bottom of the trailer frame to measure both the pitch and roll axis of the trailer, and when the roll angle exceeds certain preset limits a visual signal is generated. Pitts '996 teaches a stabilizer system also mounted under the trailer bed and adjacent to the rear wheels of the trailer which incorporates a pendulum means oriented to swing transversely to the chassis. Thus, the Pitts '996 invention measures the roll angle of the trailer with respect to the vertical axis. When the pendulum swings out of the vertical plane and contacts one of two microlimit switches on either side, a hydraulic system is triggered to level the trailer. Snead '128 teaches the use of two mercury switches mounted at the center underside of the dump bed; each switch responds when the roll angle of the trailer exceeds a predetermined angle in either direction and an alarm is triggered and a safety valve is opened to lower the truck trailer. The Snead '128 invention compensates for the vertical angle or the pitch of the trailer bed and teaches that the critical roll angle of the dump bed is different when the trailer bed is lowered than when the trailer bed is raised. Finney '578 likewise measures the roll axis of the trailer bed using mercury switches located along the center bottom of the trailer.

There are several disadvantages associated with the devices presented in the prior art that are overcome by the present invention. One disadvantage is that the measuring devices of all of the above inventions are placed towards or at the rear of, and mounted on the underside of the truck trailer. Access to the devices for repair and maintenance is difficult and can be hazardous. Secondly, the type of device actually used to detect the roll angle of truck trailer disclosed in the prior art also presents a severe disadvantage overcome by the present invention. Except for the pendulum means of Pitts '996 and the plumb vane means of Brawner, Jr. '145, all referenced prior art devices incorporate mercury switches to indicate when the roll angle of the trailer bed exceeds a predetermined safety limit. Mercury switches, under these circumstances, are extremely sensitive to small displacements, and a displacement of one side of the trailer bed of only three or four inches with respect to the other side of the trailer bed will cause the mercury switch to detect a "hazardous" condition. For instance, when a traveling truck hits a pot hole or is on an uneven surface, such as an unimproved rocky road, one side of the truck trailer could easily be displaced a distance of three or four inches relative to the other side of the truck trailer, and the alarm systems disclosed in the prior art would be inadvertently triggered. This occurs frequently enough so that the truck operators either turn off or permanently disconnect the detection and warning system to avoid the continuous aggravation of these false alarms.

Yet, another crucial disadvantage associated with the prior art, and as previously mentioned, is that all of these devices taught in the prior art measure the roll angle of the trailer, i.e., the rotation of the trailer bed about the center axis extending the length of the trailer. But, when the trailer is raised, the actual angle which determines whether the trailer will tip on its side is not the angle which the trailer rotates on its own axis (the roll angle), but the degree angle peading through which the front end of the trailer travels along a radial path having a radius determined by the length of the telescoping hydraulic cylinder with the pivot at the fifth wheel. The present invention incorporates an angle measuring device mounted on or near the fifth wheel of the trailer which measures the angle of revolution (tip angle) of the front end of the extended trailer about the fifth wheel pivot. Further, the tip angle is measured at the most distant point from the fifth wheel, i.e., directly above the fifth wheel, when the telescoping hydraulic cylinder is extended. Assuming, for the sake of geometrical illustration, that a point on the fifth wheel of the trailer is labelled Point A, and directly above Point A on the bottom of the raised trailer is Point B. Also assume, that through Point B, perpendicular to Line AB, is a line extending equidistant on either side of Point B, whose end points are Points C and D. Line CD represents the width of the bottom of the trailer bed, approximate dimensions being ninety to one hundred two inches, and Point B represents the center of the trailer bed at the front end of the trailer. The prior art referenced herein measures the rotation of a line, which is parallel to Line CD about the roll axis of the trailer bed. Therefore, using the suggested critical angle of five degrees as taught in Snead '128, a displacement of the side of the truck with respect to Point B or the other side of the bed of approximately 3.9 to 4.5 inches would indicate a dangerous situation in the roll of the trailer bed. Brawner, Jr. '145 measures the angle from which one of the rear wheels deviates from the other rear wheel on the opposite side of the trailer. A displacement of approximately three inches indicates that roll angle of the trailer bed is approaching a dangerous angle. Referring to Points A and B as described above, the present invention, as embodied herein, measures the rotation of Point B about Point A, or the rotation of the trailer bed around the fifth wheel with the hydraulic telescoping cylinder as the radius arm. Using actual measurements, the dimensions of an extended hydraulic telescoping cylinder used on a dump truck is typically two hundred ninety six to four hundred inches, and a determination of the critical tip angle at which a warning system should indicate a hazardous condition is approximately two and one-half to four degrees. The distance through which the raised trailer as to move to trigger the warning and alarm system described herein is given by the tangent of the critical tip angle ($2\frac{1}{2}°$ to $4°$) multiplied by the dimensions of the extended hydraulic cylinder (296 to 400 inches). Therefore, a movement on Point B approximately thirteen to twenty-nine inches of either side of vertical will be adequate to trigger the warning system embodied herein depending on the dimensions of the hydraulic cylinder and the value of the critical angle used. This difference between measuring approximately three or four inches at the rear of the trailer (as taught by the prior art) to the measurement of approximately thirteen to twenty-nine inches (at the front of the trailer, by the use of a taut cable between Points A and B, which cable is coupled to a pendulum having a pivot point at or near Point A) diminishes, if not eliminates, the possibility of false alarms.

BRIEF DESCRIPTION OF THE DRAWINGS

FIG. 1 is a side elevation view of a tractor-trailer dump truck equipped with the warning and safety system wherein the trailer is in a raised position.

FIG. 2 is a side view of the fifth wheel of a truck tractor illustrating the mounting of the warning and safety system.

FIG. 3 is a perspective view of a truck trailer illustrating those components of the warning and safety system mounted on the underside of the trailer.

FIG. 6 illustrates the warning and safety system if removed from the tractor-trailer dump truck.

DESCRIPTION OF THE PREFERRED EMBODIMENT

Figure 4:
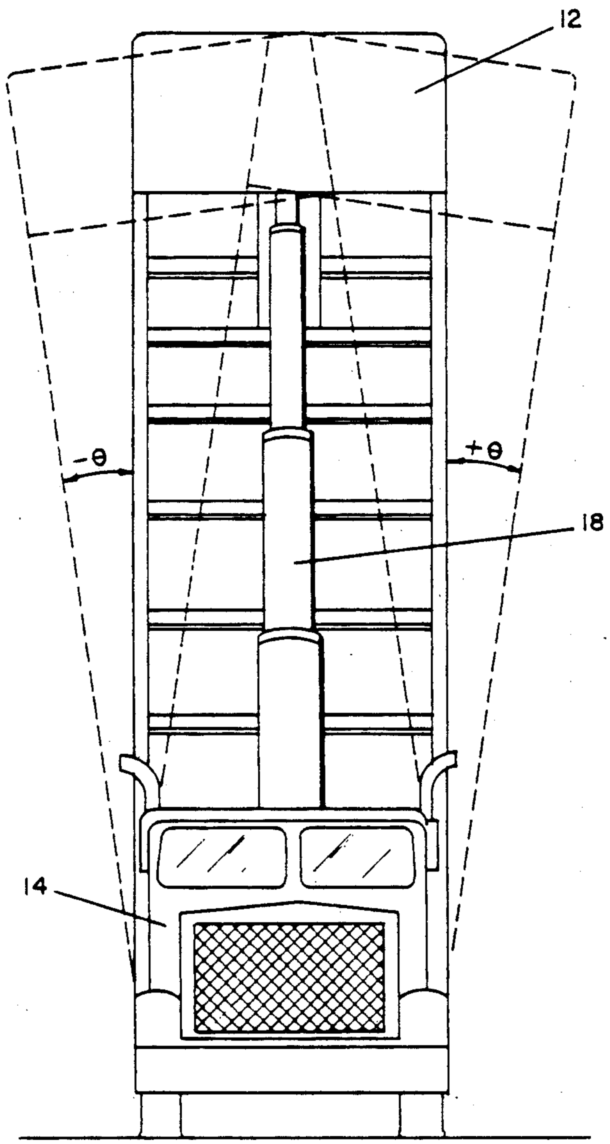
FIG. 4 is a front end view of a tractor-trailer truck with the dump trailer in a raised position, showing, in phantom, the trailer tilted at an angle from the vertical.

Referring to FIG. 1, the typical dump truck 10 with a trailer 12 and a tractor 14 is shown. Located on the fifth wheel 16 of the trailer 12 is a hydraulic telescoping cylinder 18 which raises the front end of the trailer 12 to dump the material from the rear end of the trailer 12 through a hinged tailgate 20. The trailer 12 is additionally supported at its center by suck-up arms 22, 22' extending from the fifth wheel 16 to the underside of the trailer 12, via pins 52 (FIGS. 1 and 3). Note that the front pair of the tandem rear wheels 24 of the trailer 12 are also raised from the ground when the trailer 12 is raised, although the invention can also be installed on a trailer with a frame where all the wheels stay on the ground.

As shown in FIGS. 1, 2 and 6, the warning and safety system 26, outside the cab of the tractor 14, comprises a pivoting canister 28, a mounting bracket 30 with springs 32 and side compartments 34, 34', some audible alarm, for example, an air horn 36 and horn mounting brackets 38 and hose clamps 40 and 40' to mount the air horn 36 onto the hydraulic telescoping cylinder 18. The warning and safety system 26 further comprises the additional elements shown in FIG. 3: a cable 42, a pulley 44, a spring loaded reel 50.

As most clearly shown in FIG. 2, the pivoting canister 28 is mounted on the fifth wheel 16 of the trailer 12 behind the hydraulic telescoping cylinder 18. An inclinometer (not seen), common to the art, is mounted within the canister 28. The canister 28 is pivotly mounted between side compartments 34, 34' (as shown in FIG. 2) so that the canister 28 may pivot in the tip directions freely by means of the cable 42. The mounting bracket 30 is bolted or otherwise fixedly attached to the fifth wheel 16. Springs 32 help to cushion the instrumentation within the canister 28. On either side of the canister 28 are small compartments 34, 34' containing the necessary wiring and air solenoid valves for the proper functioning and testing of the warning and safety system 26. compartments 34, 34' have drain holes (not seen) in the bottom so that water can drain and air can circulate within the compartments 34, 34'.

Alternatively, the inclinometer or other angle measuring instrument may be mounted directly on the telescoping hydraulic cylinder 18. Sometimes the load does not expel through the rear hinged gate 20 when the hydraulic telescoping cylinder 18 is fully extended. With the hydraulic cylinder 18 fully extended, the operator may jerk the tractor 14 forward in an attempt to loosen the material, and if that particular maneuver isn't successful, the operator, with the trailer brakes engaged, may back the tractor 14 towards the trailer 12. In this fashion, the suck-up arms 22, 22', rather than the hydraulic cylinder 18, support the trailer 12 and the cylinder 18 may be lifted from or pop out of its socket on the fifth wheel 16. When the truck 10 returns to its normal position, the cylinder 18 may fall onto and damage the canister 28. Thus, mounting the inclinometer or other angle measuring device directly onto the cylinder 18 is an alternative placement which is particularly advantageous under these circumstances.

Air horn 36 is attached to a metal bracket 38 mounted onto the telescoping hydraulic cylinder 18 by means of two large hose clamps 40, 40'. The open end of the air horn 36 faces downward to prevent oil and dirt from accumulating within the horn 36. Wiring between the air horn 36, the warning and safety system 26 and the tractor 14 is also provided. The air horn 36 requires an air solenoid valve 58, an air line 60, and an air filter 62 through which air from the reserve air supply line 64 passes. While air horn 36 provides an alarm in this particular embodiment of the invention, it is to be understood that any alarm, for example, a loud siren and/or bright flashing rotating lights, would serve the same purpose of providing conspicuous sensory alarms, as will be discussed later.

FIGS. 1 and 2 further illustrate the cable 42 attached to the center top of pivoting canister 28. Preferably, the cable 42 is one-sixteenth stainless steel aircraft cable, which provides adequate tensile strength and is rust-resistant. As shown in FIGS. 1–3, cable 42 extends vertically from the canister 28 to a pulley mechanism 44 rigidly mounted behind the hydraulic attachment pin 46 at the cylinder well 48 on the underside of the front end of the truck trailer 12. When the telescoping hydraulic cylinder 18 is fully extended, the cable 42 extends parallel to the telescoping hydraulic cylinder 18. Pulley 44 is most preferably of a sealed ball bearing aircraft pulley cable type, commonly found in the art. Cable 42 passes around this pulley mechanism 44 and terminates at a spring loaded reel 50 mounted on the rear bottom center of the cylinder well 48 on the trailer 12. The spring loaded reel 50 operates to keep cable 42 taut regardless of the position of the trailer 12, and will rewind cable 42 when the trailer 12 is in the level or down position.

The warning and safety system 26 is automatically supplied with electrical power by several optional means. The preferred option is to place an enabling switch 54 either on the hydraulic telescoping cylinder 18 as illustrated in FIG. 1 or at the release mechanism for the tailgate 20 not shown. Thus, when operator manually releases the tailgate 20, the enabling switch is also automatically activated and will turn on the warning and safety system 26. If the warning and safety system 26 is enabled in this fashion, the switch 54 automatically turns on the system, and operates to compensate for inexperienced or forgetful operators who may not turn the system 26 on manually. Another option is to place a pressure-sensitive switch 54' at the suck-up arm well 52' onto the trailer 12. When the trailer 12 is raised a minimal distance, for example, three to eight inches, the switch 54' detects the decrease in pressure and sends a signal to the warning and safety system 26 which automatically energizes the system 26. It will become apparent to those skilled in the art that the foregoing energizing mechanisms are only three examples of methods to provide automatic power to the warning and safety system 26 described herein.

Mounted within canister 28 is an inclinometer common to the art. The preferred characteristics required of the inclinometer or the instrument is that it incorporate electronics sensitive to angular deviations in one or more directions and generate electrical signals when a preset critical angle is detected. The instrument, moreover, must allow for adjustment or variation of the critical angle; should present a time delay means; and lastly, should be dampened to prevent false alarms. Most preferably, the inclinometer incorporates a gimbal-mounted pendulum inductively coupled to position-sensing electronics, wherein the pendulum is suspended within a viscous fluid, such as silicon or oil, which operates to dampen erratic pendulum oscillations within the inclinometer resulting from slight and frequent vibrations or other momentary inertial forces, such as when the load is being dumped on a rocky or uneven road. One such typical inclinometer is P-Q CONTROLS, INC. automatic platform leveler MODEL 410. Other examples of instruments which could be placed within the canister 28 are the BIAXIAL INCLINOMETER MODEL MP-20 from TERRA TECHNOLOGY CORP.; the ROBINSON-HALPERN MODEL 685 B INCLINOMETER; the MODEL ADS-C131-1A or ADS-C231-1A from WATSON INDUSTRIES, INC.; or a DC-operated gravity-referenced tilt sensors, such as those available from SCHAEVITZ SENSING SYSTEMS, INC.

One advantage of using the preferred embodiment of the inclinometer and cable 42, described herein, rather than a mercury switch as employed in the prior art, is that the critical tip angle at which an extended trailer 12 is approaching a hazardous condition can be adjusted to accommodate the various dimensions of the trailer 12. The height of telescoping hydraulic cylinders 18 vary with different trailers 12, and adjustment of the critical tip angle may be accomplished simply. The simple adjustment of the critical tip angle is not possible with the use of mercury switches. Secondly, a variation of the critical tip angle allows for the placement of two inclinometers within the canister 28, each with a different preset critical tip angle, thus providing for first stage alarms and second stage alarm actions of the warning and safety system 26. The first inclinometer signals that a hazardous condition exists and triggers various first stage alarms, audible and/or visual. The second inclinometer, on the other hand, monitors a second slightly larger critical angle tip indicative of an inevitable trailer tip-over, and triggers the second stage safety features which will automatically dump oil from the hydraulic cylinder 18 back into the reserve, and lower the truck trailer 12 prior to tipping over. The variable time delay is also a preferable feature requiring that the critical tip angle condition must endure for the duration of the time delay before the invention will trigger either first stage hazardous condition alarms or second-stage tip-over actions, further eliminating false spurious signals and false alarms. Dampening the movement of the pendulum in a viscous fluid further prevents false alarms.

Figure 5:
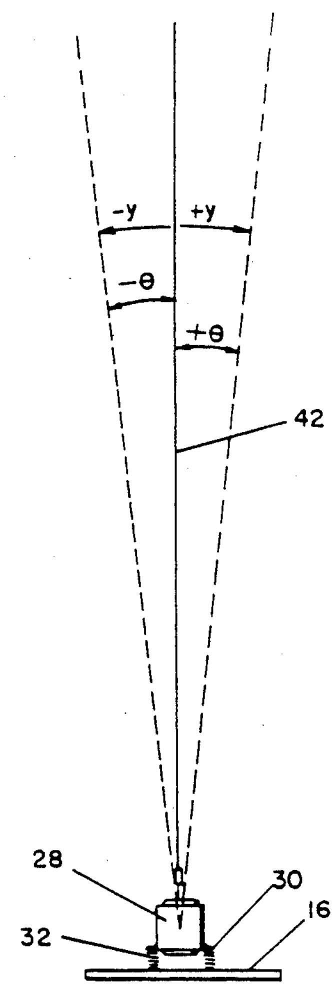
FIG. 5 is a cut-away view of that portion of the warning and safety system illustrating in phantom the deviation from vertical of the cable.

Referring now to FIGS. 4 and 5, and discussing the mode of operation of the truck trailer warning and safety system 26, cable 42 extends from the pivoting canister 28 to a position on the underside of the front end of the trailer 12. When rear pair of wheels 24 of trailer 12 is on an uneven surface, the hydraulic cylinder 18 and the trailer 12 will attempt to revolve around or pivot about the connection (not shown) between telescoping hydraulic cylinder 18 and fifth wheel 16 through some tip angle $\Theta$ as shown in phantom in FIG. 4. The cable 42 passing around pulley 44 rigidly attached to the bottom of the front end of the trailer 12 also moves through this same tip angle $\Theta$ and causes the canister 28 or the directly mounted instrument also to pivot. If the pivot angle exceeds the preset critical angle, in the approximate range of $2\frac{1}{2}°$ to $4°$, of a first inclinometer for a time duration longer than the preset time delay, preferably 0.3–0.5 seconds, a signal is generated. This signal in turn triggers the first-stage alarms which may include an audible alarm, preferably air horn 36, or a siren, and may further set off additional visual alarms. If the first-stage hazardous condition is not corrected and the tip angle Θ exceeds the second preset critical angle of the second inclinometer for a time duration longer than its preset time delay, preferably 0.3–0.5 seconds, the second-stage safety actions are initiated. Then, a signal is sent via a fast open/slow close valve to the hydraulic telescoping cylinder 18 which dumps the oil in the hydraulic system back into the reserve tank, and immediately and automatically lowers the trailer 12 so that it will not tip over.

The electrical connections and data line connections of the warning and safety system 26 will be described. Within the pivoting canister 28 and the side compartments 34, 34' and electrical cable 56, there are several electrical lines. One line provides power to the inclinometer(s) mounted within the canister 28, while a second line is connected to ground. The third and fourth electrical conductors lead to the inclinometer(s) and detect the angular deviation of the tip angle in either direction from the vertical, or the +Y and the −Y directions. A fifth and a sixth line connects the two air solenoid valves mounted in the side compartments 34, 34', and are used to test the responsiveness of the inclinometer(s) with respect to the angle of deviation from the vertical in both the +Y and the −Y directions. Referring now to FIG. 6, electrical cable 56 extends to the horn mounting bracket 38. Extending from the air horn mounting bracket 38, is a second electrical cable 66, preferably coiled and environment-resistant which, as shown in FIG. 1, passes through the tractor cab 14 to a junction box 68.

Junction box 68 is further connected to an optional small control box 70 mounted on the dash within the tractor cab 14. A view of the control box 70 is further shown in FIG. 6, and shows a left/right toggle switch 72, a left test light 74, a right test light 76, and an ON/OFF indicator light 78. An optional test feature of the warning and safety system 26 is provided. The operator, sitting in the cab, will turn toggle switch 72 to the left. The left test light 74 will illuminate, but more importantly, a signal will be sent via the fifth electrical line to the "left" or the +Y air solenoid valve mounted in side compartment 34, 34'. This valve will generate air pressure and will cause the pivoting canister 28 to pivot in one direction, the +Y direction, to the preset critical angle, which will in turn trigger the various first stage alarms. Likewise, if toggle switch 72 is turned to the right, the right indicator test light 76 will illuminate, a signal will be sent to an "right" or the −Y air solenoid valve mounted in the side compartment 34, 34', the pivoting canister 28 will pivot to the critical angle in the other or the −Y direction, and the alarms will respond. Note that there is no ON/OFF switch in the cab. As discussed earlier, a switch such as 54 will generate a signal to empower the warning and safety system 26.

Thus, a beneficial and improved warning and safety system has been invented to prevent damage and lessen danger in the use of the dump trucks. It will be apparent to those skilled in the art that modifications and variations can be made to the warning and safety system of the invention. The invention in its broader aspects is therefore not limited to the specific details, representative methods and apparatus and illustrative examples shown and described herein above. Thus, it is intended that all matter contained in the foregoing description or shown in the accompanying drawings shall be interpreted as illustrative and not in a limiting sense, and the invention is intended to encompass all such modifications and variations as fall within the scope of the appended claims.

We claim:

1. In a tractor-trailed truck, including a trailer capable of being raised by a hydraulic cylinder mounted between the front end of said trailer and the fifth wheel of said trailer, means for detecting the side-to-side or tip rotation of the front end of said trailer about the connection between said hydraulic cylinder and said fifth wheel, said detecting means including tip angle measuring means mounted adjacent to said fifth wheel, and means connecting said tip angle measuring means with one of said front end of said trailer or said hydraulic cylinder adjacent said front end of said trailer, said connecting means moving though substantially the same angle as said front end of said trailer, when said front end of said trailer undergoes tip rotation, to thereby proportionally rotate said tip angle measuring means.

2. The combination as set forth in claim 1, wherein said tip angle measuring means includes means for rotatably mounting said tip angle measuring means.

3. The combination as set forth in claim 2, wherein said mounting means is attached to one of said fifth wheel or said hydraulic cylinder in a location adjacent to said fifth wheel.

4. The combination as set forth in claim 1, wherein said connecting means includes a cable connected to said tip angle measuring means.

5. The combination as set forth in claim 4, wherein said connecting means includes means for maintaining said cable in tension as said trailer is raised or lowered by said hydraulic cylinder.

6. The combination as set forth in claim 5, wherein said tip angle measuring means includes means for rotatable mounting said tip angle measuring means.

7. The combination as set forth in claim 6, wherein said mounting means is attached to one of said fifth wheel or said hydraulic cylinder in a location adjacent to said fifth wheel.

8. The combination as set forth in claim 7, wherein said tip angle measuring means includes an inclinometer.

9. The combination as set forth in claim 1, wherein said tip angle measuring means includes means for adjusting and setting at least one angle indicative of an unstable position in which said trailer is in danger of tipping over, means for comparing said tip angle of rotation to said one set angle, and means for signaling when said tip angle of rotation is equal to or exceeds said one set angle.

10. The combination as set forth in claim 9, further including means for adjusting and setting a second angle, said second angle being greater than said one set angle, means for comparing said tip angle with said second angle and means for releasing hydraulic fluid from said hydraulic cylinder when said tip angle of revolution is equal to or exceeds said second angle, thereby automatically lowering said trailer.

11. In a tractor-trailer dump truck having a trailer with an extendible cylinder connected between a fifth wheel on said trailer and the front end of said trailer for lifting said front end of said trailer, a method of preventing damage to said trailer when said trailer is raised to dump materials and said tractor-trailer dump truck is an unstable condition and said trailer may tip over, said method comprising the steps of:

(a) measuring the pivot angle about which the front end of the extended trailer pivots about said fifth wheel along a radial path determined by the movement of the connection between said front end of said trailer and said cylinder about said fifth wheel;
(b) comparing said pivot angle with a predetermined critical angle representing a deviation of said front end of said trailer from the vertical at which said trailer is in an unstable condition; and
(c) signaling an alarm when said pivot angle equals or exceeds said critical angle.

12. The method as set forth in claim 11 further including:
(a) comparing said pivot with a second predetermined critical angle, said second critical angle being greater than said predetermined critical angle; and
(b) signaling a second stage alarm which automatically lowers said trailer along said cylinder when said pivot angle equals or exceeds said second critical angle.

13. In a trailer dump truck having a tractor and a trailer with a fifth plate, said trailer capable of being raised by a hydraulic telescoping cylinder, said hydraulic cylinder being coupled to said fifth plate and coupled to the front end of said trailer, comprising in combination:
(a) means for detecting an angle of revolution of said trailer around said fifth plate along a radial path determined by the movement of said trailer-hydraulic coupling about said fifth plate;
(b) means for adjusting and setting at least one critical angle wherein as said angle of revolution approaches said one critical angle said trailer approaches an unstable position in danger of tipping over;
(c) means for comparing said angle of revolution to said one critical angle;
(d) means for signaling when said angle of revolution is equal to or exceeds said one critical angle;
(e) means for mounting said detecting means said adjusting and setting means, and said comparing means;
(f) a cable means connected to said detecting means and a cable-rewind mechanism mounted on the underside of said trailer to maintain said cable taut; and where in when said trailer is raised and approached an unstable condition, said cable causes said detection means to pivot through said angle of revolution thereby activating said signaling means when said angle of revolution is equal to or exceeds said one critical angle.

* * * * *